(12) United States Patent
Mizuno et al.

(10) Patent No.: US 8,650,983 B2
(45) Date of Patent: Feb. 18, 2014

(54) STEERING APPARATUS FOR VEHICLE

(75) Inventors: Taichi Mizuno, Anjo (JP); Hidetoshi Inayoshi, Nukata-gun (JP); Kazuhiro Maki, Chiryu (JP); Morito Oshita, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 8 days.

(21) Appl. No.: 13/439,160

(22) Filed: Apr. 4, 2012

(65) Prior Publication Data

US 2012/0247259 A1    Oct. 4, 2012

(30) Foreign Application Priority Data

Apr. 4, 2011 (JP) ................................. 2011-082533

(51) Int. Cl.
*B62D 1/16* (2006.01)

(52) U.S. Cl.
USPC ........................................................... 74/496

(58) Field of Classification Search
USPC .............................. 74/493, 494, 495; 280/775
See application file for complete search history.

(56) References Cited

U.S. PATENT DOCUMENTS

| | | | | |
|---|---|---|---|---|
| 4,602,520 A | * | 7/1986 | Nishikawa et al. | 74/493 |
| 5,178,411 A | * | 1/1993 | Fevre et al. | 280/775 |
| 5,911,789 A | * | 6/1999 | Keipert et al. | 74/493 |
| 6,390,505 B1 | * | 5/2002 | Wilson | 280/775 |
| 7,410,190 B2 | | 8/2008 | Sawada et al. | |
| 7,444,900 B2 | * | 11/2008 | Tomaru et al. | 74/495 |
| 2009/0000417 A1 | | 1/2009 | Oshita et al. | |

FOREIGN PATENT DOCUMENTS

JP   2008-068870 A   3/2008
JP   2009-006743 A   1/2009

* cited by examiner

*Primary Examiner* — Justin Krause
(74) *Attorney, Agent, or Firm* — Buchanan Ingersoll & Rooney PC

(57) ABSTRACT

A steering apparatus for a vehicle, adjusting a position of a steering wheel in a longitudinal direction of a vehicle body, includes a main tube supported by the vehicle body and having a tubular shape, the main tube including an opening portion being closed in an axial direction of the main tube and extending in the axial direction, a telescopic tube supported by the main tube to be slidable within the main tube, a connecting member firmly attached to the telescopic tube to be movable within the opening portion along the axial direction of the main tube, a drive member connected to the connecting member, and a drive source driving the drive member to move the connecting member in the axial direction.

8 Claims, 5 Drawing Sheets

… (1) …

STEERING APPARATUS FOR VEHICLE

CROSS REFERENCE TO RELATED APPLICATIONS

This application is based on and claims priority under 35 U.S.C. §119 to Japanese Patent Application 2011-082533, filed on Apr. 4, 2011, the entire content of which is incorporated herein by reference.

TECHNICAL FIELD

This disclosure generally relates to a steering apparatus for a vehicle.

BACKGROUND DISCUSSION

A known steering apparatus for a vehicle disclosed in JP2009-6743A (which will be hereinafter referred to as Reference 1) includes a tilt mechanism supporting a steering column so that the steering column is rotatable relative to a vehicle body for adjusting an operation position of a steering wheel. In addition, according to the known steering apparatus of Reference 1, an upper tube is slidably accommodated via an intermediate tube into a lower tube in an axial direction of the steering column; thereby, a so-called telescopic operation is performed by a telescopic mechanism so as to adjust the steering wheel to a desired position in the axial direction. Meanwhile, a known electric steering apparatus of a steering wheel is disclosed in JP 2008-68870A (which will be hereinafter referred to as Reference 2). The known steering apparatus of Reference 2 electrically adjusts a position of a steering wheel by utilizing an electric motor and a feed screw mechanism. Moreover, the amendment of proceedings of Reference 2 discloses a stopper restricting a movable range of an inner column by minimizing a relative movable range between a threaded rod and a nut.

In Reference 1, the lower tube and the intermediate tube are a relatively long tube and a relatively short tube, respectively. The long tube and the short tube are connected to each other to thereby correspond to a main tube of a steering apparatus of this disclosure. Additionally, in Reference 1, the upper tube corresponds to a telescopic tube of the steering apparatus of the disclosure. A cutout portion is formed in the long tube so as to extend axially. The cutout portion extending axially is opened from an opening end of the long tube. An attachment fixed to the telescopic tube (the upper tube) is accommodated in the cutout portion; thereafter, the short tube is connected and fitted to the long tube. In other words, the main tube in Reference 1 is formed by two portions, therefore increasing the number of components. In addition, a means of connecting the short tube to the long tube is necessary, resulting in a cost increase.

Meanwhile, according to the steering apparatus disclosed in Reference 2, an outer column corresponds to the main tube of the disclosure and the inner column corresponds to the telescopic tube of the disclosure. A connecting bracket (corresponding to the aforementioned attachment) fixed to the telescopic tube is arranged separately from the main tube. In addition, the attachment is not configured so as to enter the main tube. Therefore, the aforementioned cutout portion is not formed in the main tube. In addition, the stopper restricting the movable range of the telescopic tube is not arranged at the main tube or the telescopic tube. The stopper restricting the relative movable range between the threaded rod and the nut as described above is positioned at a drive member. That is, with regard to the telescopic mechanism, a relation between the configurations of the main tube (the outer column) and the telescopic tube (the inner column) that are disclosed in Reference 2 differs from a relation between the configurations of the main tube (formed by the lower tube and the intermediate tube) and the telescopic tube (the upper tube) that are disclosed in Reference 1. Likewise, the relation between the configurations of the main tube (the outer column) and the telescopic tube (the inner column) according to Reference 2 differs from a relation between the configurations of the main tube and the telescopic tube according to the disclosure.

A need thus exists for a steering apparatus for a vehicle, which is not susceptible to the drawbacks mentioned above.

SUMMARY

According to an aspect of this disclosure, a steering apparatus for a vehicle, adjusting a position of a steering wheel in a longitudinal direction of a vehicle body, includes a main tube supported by the vehicle body and having a tubular shape, the main tube including an opening portion being closed in an axial direction of the main tube and extending in the axial direction, a telescopic tube supported by the main tube to be slidable within the main tube, a connecting member firmly attached to the telescopic tube to be movable within the opening portion along the axial direction of the main tube, a drive member connected to the connecting member, and a drive source driving the drive member to move the connecting member in the axial direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
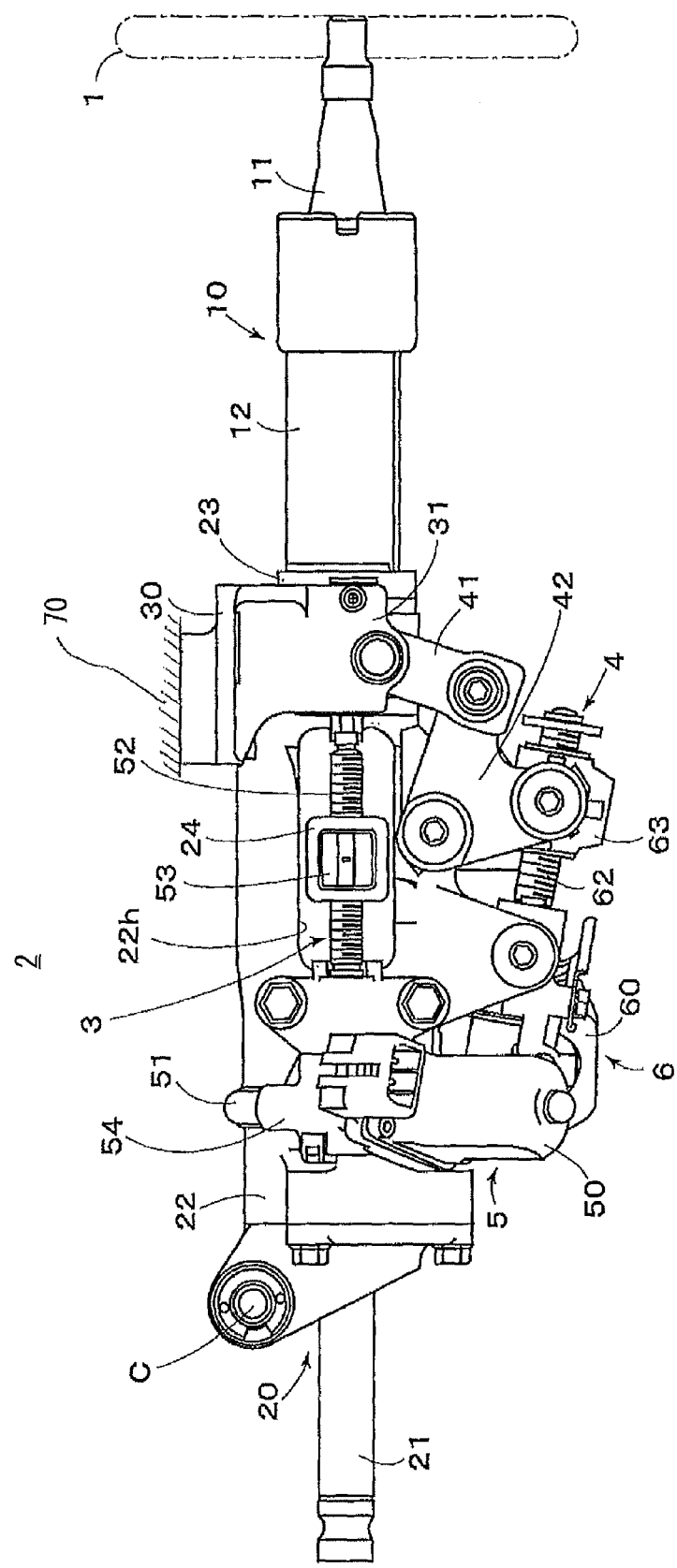
FIG. 1 is a side view of a steering apparatus for a vehicle according to an embodiment disclosed here.
Figure 2:
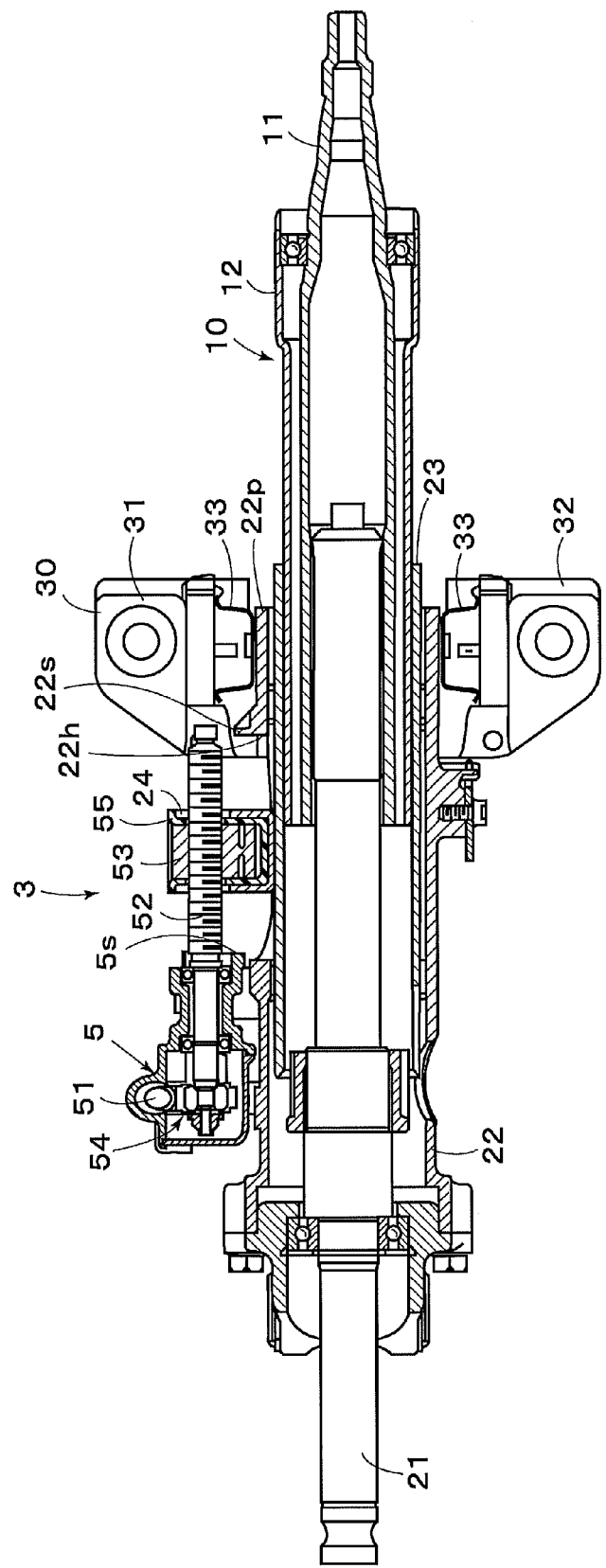
FIG. 2 is a longitudinal cross-sectional view of the steering apparatus according to the embodiment disclosed here.

An embodiment of this disclosure will be described as follows with reference to the illustrations of the attached drawings. Each of FIGS. 1 and 2 illustrates a steering apparatus 2 for a vehicle according to the embodiment. The steering apparatus 2 supports a steering wheel 1 so as to adjust an operation position of the steering wheel 1 relative to a vehicle body 70. In addition, for example, the steering apparatus 2 may be equipped with an electric power steering system. Alternatively, for example, in a case where the steering apparatus 2 corresponds to a steer-by-wire steering apparatus, the steering apparatus 2 is electrically connected to a wheel turning mechanism to turn angles of wheels of the vehicle.

The steering apparatus 2 of the embodiment includes a first column member 10 supporting the steering wheel 1 by a rear end and a second column member 20 arranged coaxially with the first column member 10. A pivot C is located at a front portion of the second column member 20. The second column member 20 is supported by the pivot C so as to rotate thereabout vertically relative to the vehicle body 70. The second column member 20 is retained by and fixed to a fixing bracket 30. Here, the first column member 10 includes an upper shaft 11 connected to the steering wheel 1 and an upper tube 12 arranged coaxially with the upper shaft 11 so as to accommodate the upper shaft 11. The upper tube 12 is connected to the upper shaft 11 so as to rotate about the pivot C. The upper shaft 11 and the upper tube 12 are configured so as to axially move integrally with each other. Meanwhile, the second column member 20 includes a lower shaft 21 and a main tube 22 arranged coaxially with the lower shaft 21 so as to accommodate the lower shaft 21. The upper tube 12 is accommodated within the main tube 22 via a telescopic tube 23 so as to slide axially.

As illustrated in FIG. 2, the upper shaft 11 and the lower shaft 21 are spline-fitted to each other so as to move axially. In addition, the telescopic tube 23 is supported by the main tube 22 so as to move or slide axially within the main tube 22. Thus, the telescopic tube 23, the upper tube 12, the upper shaft 11, and the steering wheel 1 are axially movable, thereby configuring a telescopic mechanism 3. As a result, the steering wheel 1 may be adjusted to a desired position in a longitudinal direction of the vehicle body 70.

The fixing bracket 30 includes a pair of holding portions 31 and 32 facing each other and extending toward a lower side of the vehicle. The main tube 22 is arranged between the holding portions 31 and 32 and is held thereby. An upper portion of the fixing bracket 30 is fixed to the vehicle body 70. Further, pressurizing mechanisms 33 are arranged between the holding portion 31 and the main tube 22 and between the holding portion 32 and the main tube 22, thereby pressing and supporting the main tube 22 so that the main tube 22 is axially slidable. In addition, as illustrated in FIG. 2, a pressure receiving portion 22p is integrally formed with the main tube 22. The pressurizing mechanisms 33 are formed by plate springs. In view of vibrational stiffness of the steering apparatus 2, it is appropriate for the pressurizing mechanisms 33 to be arranged in a position close to the steering wheel 1 as illustrated in FIG. 2.

The main tube 22 according to the embodiment is formed by a single tubular member made of metal such as aluminum. The main tube 22 includes an opening portion 22h having an elongated shape being axially closed and extending axially. An attachment 24 corresponding to a connecting member is arranged in the opening portion 22h so as to move axially and is firmly attached to the telescopic tube 23. The attachment 24 is a tubular member made of metal and having a bottom portion. The attachment 24 is provided so as to be locked by front and rear ends (one and the other ends) of the opening portion 22h in the longitudinal direction of the vehicle body 70 (in an axial direction of the main tube 22). The bottom portion of the attachment 24 is welded to an outer surface of the telescopic tube 23.

Figure 3:
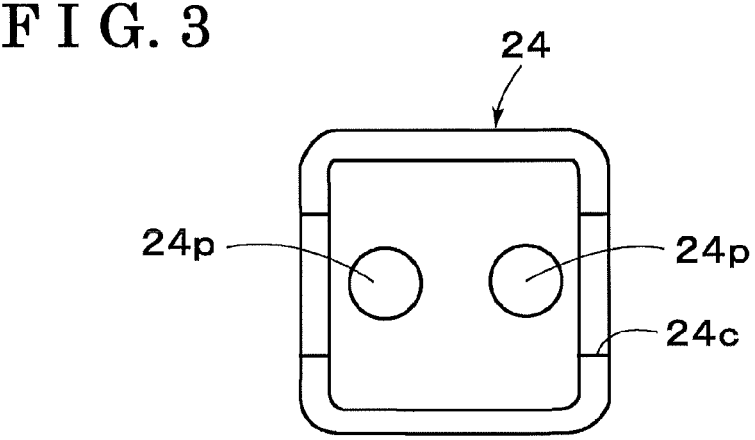
FIG. 3 is a plan view of an attachment of the steering apparatus according to the embodiment disclosed here.
Figure 4:
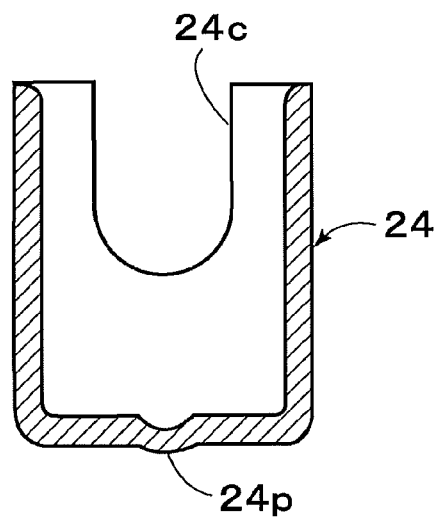
FIG. 4 is a side view of the attachment of the steering apparatus according to the embodiment disclosed here.
Figure 5:
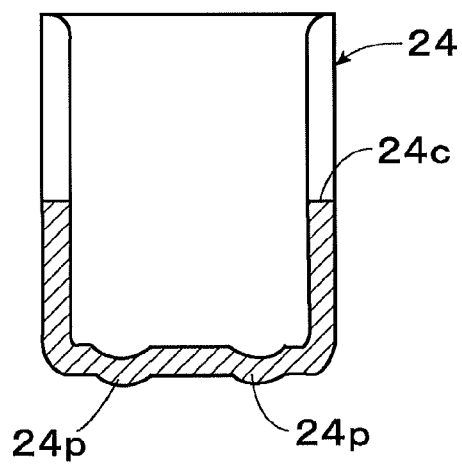
FIG. 5 is a front view of the attachment of the steering apparatus according to the embodiment disclosed here.
Figure 6:
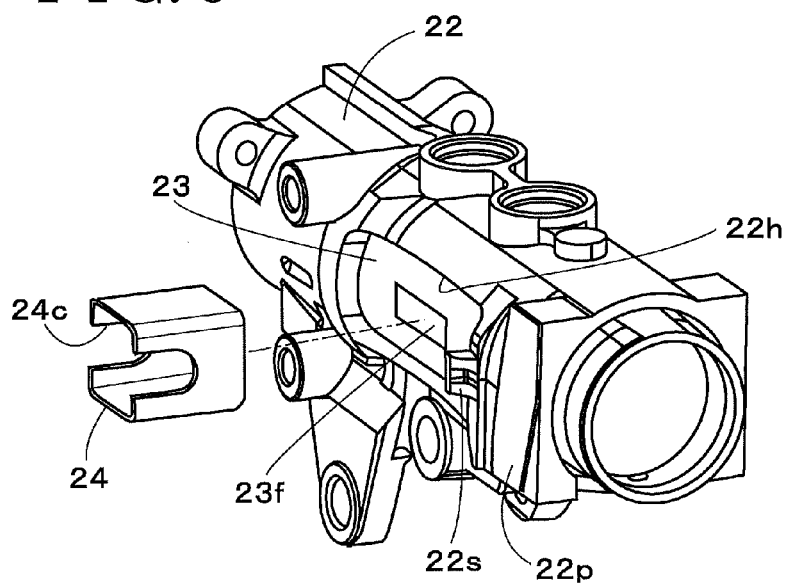
FIG. 6 is a perspective view illustrating a process to weld the attachment to a telescopic tube of the steering apparatus according to the embodiment disclosed here.

A projection welding process is used to weld the attachment 24 to the outer surface of the telescopic tube 23 in order to refrain the attachment 24 from being deformed by heat of the telescopic tube 23. Each of FIGS. 3 to 5 illustrates a configuration of the attachment 24 that is appropriate for the projection welding process. Protruding portions 24p are formed at the bottom portion of the attachment 24 (the two protruding portions 24p are arranged at the bottom portion of the attachment 24 according to the embodiment). FIG. 6 is a perspective view illustrating a process to weld the attachment 24 to the outer surface of the telescopic tube 23. A planar portion 23f is formed at the outer surface of the telescopic tube 23 as illustrated in FIG. 6. In addition, the attachment 24 is welded to plural portions of the outer surface of the telescopic tube 23 in an axial direction of the telescopic tube 23. As a result, a further appropriately welded state of the attachment 24 relative to the telescopic tube 23 may be secured. As illustrated in FIGS. 4 and 6, U-shaped cutout portions 24c are formed in facing wall surfaces of the attachment 24. Details of the U-shaped cutout portions 24c will be described below.

Figure 7:
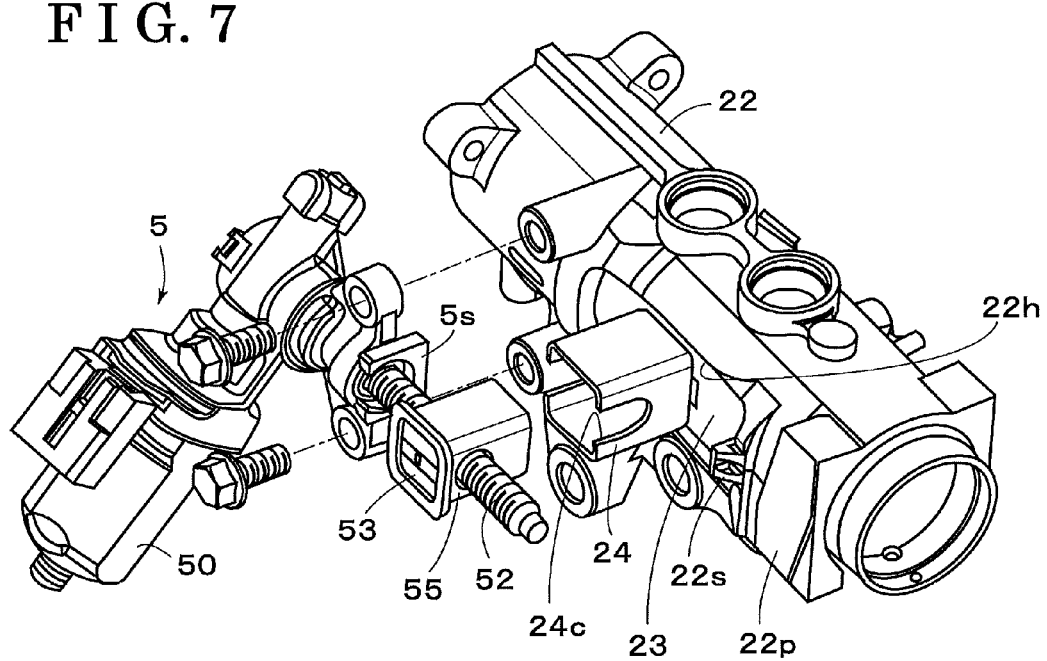
FIG. 7 is a perspective view illustrating a process to attach a drive source to a telescopic mechanism of the steering apparatus according to the embodiment disclosed here.

The steering apparatus 2 according to the embodiment includes a drive source 5 as illustrated in FIGS. 1, 2, and 7. An electric motor 50 supported by the main tube 22 is applied as the drive source 5. A screw shaft 52 connected to an output shaft 51 of the electric motor 50 and a nut 53 engaging with the screw shaft 52 and serving as a slider are arranged at the electric motor 50. The screw shaft 52 and the nut 53 correspond to drive members. That is, the nut 53 axially moves in accordance with a rotation of the screw shaft 52 driven by the electric motor 50, therefore moving the telescopic tube 23 (the upper tube 12, the upper shaft 11, and the steering wheel 1) with the nut 53 in the longitudinal direction of the vehicle body 70. In addition, according to the steering apparatus 2 of the embodiment, a speed reducing mechanism 54 is arranged between the output shaft 51 of the electric motor 50 and the screw shaft 52. A rotational speed of the electric motor 50 is appropriately reduced by the speed reducing mechanism 54 and a rotational force is transmitted to the screw shaft 52 after the rotational speed has been reduced.

Moreover, according to the steering apparatus 2 of the embodiment, as illustrated in FIG. 1, a first end portion of a first link 41 is positioned at a lower side of the fixing bracket 30 so as to be rotatably supported thereby. A second end portion of the first link 41 is rotatably supported by a first end portion of a second link 42 having a substantially V-shape. An intermediate portion of the second link 42 is positioned at a lower side of the main tube 22 so as to be rotatably supported thereby. A second end portion of the second link 42 is rotatably supported by a nut 63. The nut 63 engages with a screw shaft 62 and serves as a slider. A drive source 6 for a tilt mechanism 4 tilting the steering wheel 1 is provided at the steering apparatus 2 according to the embodiment. The nut 63 and the screw shaft 62 are arranged at an electric motor 60 utilized as the drive source 6. The screw shaft 62 is rotationally driven by the electric motor 60.

FIG. 7 is a perspective view illustrating a process to attach the telescopic mechanism 3 and the drive source 5 to each other. In a state where a cushioning member 55 is sandwiched between the nut 53 and the attachment 24, the nut 53 is accommodated in the attachment 24 welded to the telescopic tube 23 as described above. In addition, after the nut 53 is arranged in the U-shaped cutout portions 24c, the drive source 5 is attached to the main tube 22 by screws. Further, the main tube 22 includes a lock portion 22s for locking the movement of the attachment 24 in the axial direction of the main tube 22. The lock portion 22s is integrally formed with the rear end of the opening portion 22h of the main tube 22. Furthermore, a lock portion 5s is integrally formed with a housing of the drive source 5. The movement of the attachment 24 in the axial direction of the main tube 22 is restricted by the lock portion 5s located at the front end (one end) of the opening portion 22h. The lock portion 5s may be integrally formed with the front end of the main tube 22 in the same way as the lock portion 22s formed at the rear end (the other end) of the main tube 22 so as to be integrally formed therewith. According to the steering apparatus 2 of the embodiment, contact areas required for restricting the movement of the attachment 24 (the telescopic tube 23) in the axial direction are secured by the lock portion 22s and the lock portion 5s. Alternatively, in a case where contact areas required for restricting the movement of the attachment 24 (the telescopic tube 23) in the axial direction are secured at the front and rear ends of an inner surface of the opening portion 22h, the lock portion 22s and the lock portion 5s may be excluded from the main tube 22 and the housing of the drive source 5 in the steering apparatus 2 according to the embodiment.

In a case where the telescopic mechanism 3 configured as described above is driven, the electric motor 50 is driven to thereby rotate the output shaft 51. Therefore, the rotational speed of the electric motor 50 is reduced by the speed reducing mechanism 54 and the rotational force is transmitted to the screw shaft 52 after the rotational speed has been reduced. Accordingly, the nut 53 engaging with the screw shaft 52 moves axially to therefore move the telescopic tube 23 axially along with the attachment 24 in which the nut 53 is accommodated. Consequently, the upper tube 12, the upper shaft 11, and the steering wheel 1 move axially along with the telescopic tube 23. Thereafter, when the steering wheel 1 is moved to a desired position in the longitudinal direction of the vehicle body 70, the operation of the electric motor 50 is stopped; thereby, the steering wheel 1 may be adjusted to a desired operation position.

Figure 8:
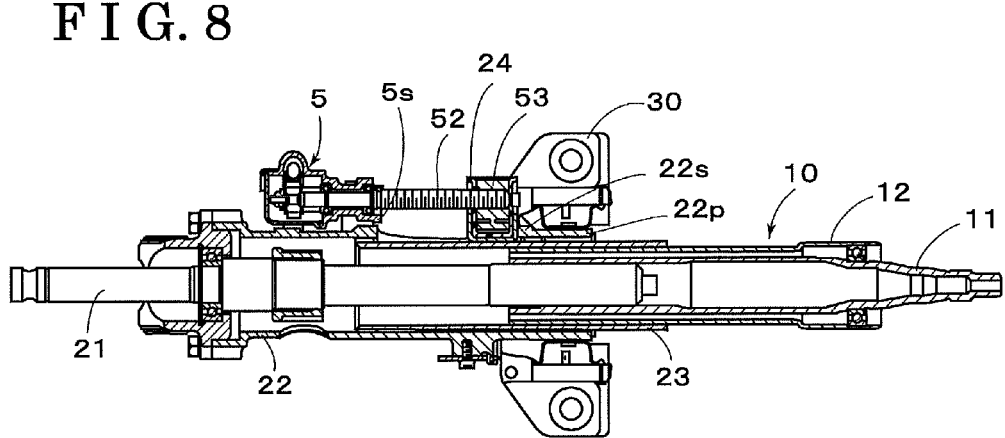
FIG. 8 is a longitudinal cross-sectional view illustrating a condition where an operation position of a steering wheel is adjusted to be nearest to a driver of the vehicle according to the embodiment disclosed here.
Figure 9:
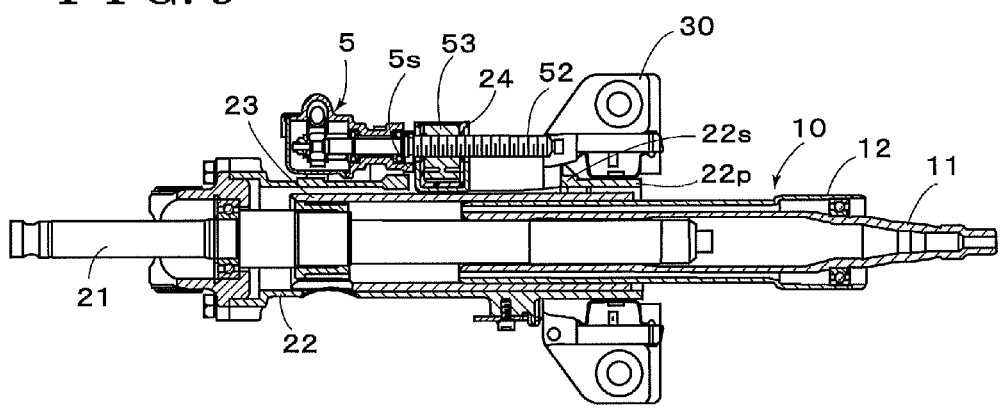
FIG. 9 is a longitudinal cross-sectional view illustrating a condition where the operation position of the steering wheel is adjusted to be most distant from the driver.

FIG. 8 is a longitudinal cross-sectional view illustrating a condition where the operation position of the steering wheel 1 is adjusted to be the rearmost position of the vehicle body 70 in the longitudinal direction, i.e., a condition where the operation position of the steering wheel 1 is adjusted to be nearest to a driver of the vehicle. FIG. 9 is a longitudinal cross-sectional view illustrating a condition where the operation position of the steering wheel 1 is adjusted to the foremost position of the vehicle body 70 in the longitudinal direction, i.e., a condition where the operation position of the steering wheel 1 is adjusted to be most distant from the driver. In FIG. 8, a rear end surface of the attachment 24 is in contact with the lock portion 22s and the telescopic tube 23 is locked at the rearmost position of the vehicle body 70 in the longitudinal direction. In FIG. 9, a front end surface of the attachment 24 is in contact with the lock portion 5s and the telescopic tube 23 is locked at the foremost position of the vehicle body 70 in the longitudinal direction. In each of the conditions in FIGS. 8 and 9, the contact areas required for restricting the movement of the attachment 24 in the axial direction (the longitudinal direction) are secured by the lock portion 22s and the lock portion 5s. Therefore, the movement of the attachment 24 may be stopped at the foremost and rearmost lock positions in the longitudinal direction, thereby appropriately restricting a moving distance (stroke) of the telescopic tube 23 in the longitudinal direction.

In addition, the steering apparatus 2 according to the embodiment has an impact absorption function and operates as follows. For example, in a normal state illustrated in FIG. 2, a load equal to or greater than a predetermined load is applied to the steering wheel 1 from a rear side toward a front side of the steering wheel 1. At this time, the upper tube 12 integrally connected to the upper shaft 11 is moved by the load axially toward the telescopic tube 23. In other words, the upper tube 12 moves forward along with the upper shaft 11 and the steering wheel 1 from the normal state illustrated in FIG. 2 to a predetermined stop position. Accordingly, the impact due to the load applied to the steering wheel 1 is absorbed by the forward movement of the upper tube 12, the upper shaft 11, and the steering wheel 1 from the normal state to the predetermined stop position. Thus, in the case that the load equal to or greater than the predetermined load acts on the steering wheel 1, the upper tube 12 is gradually accommodated in the telescopic tube 23. In addition, the upper tube 12 moves forward against a frictional force of an annular friction material arranged between the upper tube 12 and the telescopic tube 23; thereby, the impact applied to the steering wheel 1 is absorbed.

As described above, according to the aforementioned embodiment, the steering apparatus 2 for the vehicle, adjusting the operation position of the steering wheel 1 in the longitudinal direction of the vehicle body 70, the steering apparatus 2 including the main tube 22 supported by the vehicle body 70 and having the tubular shape, the main tube 22 including the opening portion 22h being closed in the axial direction of the main tube 22 and extending in the axial direction, the telescopic tube 23 supported by the main tube 22 to be slidable within the main tube 22, the attachment 24 firmly attached to the telescopic tube 23 to be movable within the opening portion 22h along the axial direction of the main tube 22, the drive member 52, 53 connected to the attachment 24, and the drive source 5 driving the drive member 52, 53 to move the attachment 24 in the axial direction.

According to the configuration of the steering apparatus 2 as described above, the main tube 22 is formed by the tubular member having the opening portion 22h being closed in the axial direction and extending in the axial direction. Therefore, the steering apparatus 2 formed at low cost by a small number of components and having the high stiffness may be obtained. In addition, a relative position of the telescopic tube 23 to the main tube 22 in the longitudinal direction of the vehicle body 70 may be smoothly and surely adjusted by the attachment 24 firmly attached to the telescopic tube 23 and axially movably arranged in the opening portion 22h, the drive member 52, 53 connected to the attachment 24, and the drive source 5 moving the attachment 24 axially by the drive member 52, 53.

According to the aforementioned embodiment, the attachment 24 is the tubular member having the bottom portion firmly attached to the outer surface of the telescopic tube 23. The drive member 52, 53 is arranged in the tubular member and is supported by the tubular member.

According to the configuration described above, the attachment 24 may be appropriately fixed to the telescopic tube 23 and may be surely connected to the drive member 52, 53.

According to the aforementioned embodiment, the lock portions 22s and 5s are formed at the front and rear ends, respectively, of the opening portion 22h of the main tube 22 in the axial direction. The attachment 24 is contactable with the respective lock portions 22s and 5s.

According to the configuration described above, the movement of the attachment 24 and the movement of the telescopic tube 23 in the axial direction are surely limited by the lock portion 22s and the lock portion 5s. Therefore, a movable range of the telescopic tube 23 may be set to thereby appropriately minimize the moving distance of the telescopic tube 23 in the axial direction.

According to the aforementioned embodiment, the bottom portion of the attachment 24 is welded to the plural portions of the outer surface of the telescopic tube 23 in the axial direction of the telescopic tube 23.

According to the configuration described above, the attachment 24 may be easily and firmly attached to the telescopic tube 23.

According to the aforementioned embodiment, the drive source 5 is the electric motor 50 supported by the main tube 22. The drive member 52, 53 includes the screw shaft 52 connected to the output shaft 51 of the electric motor 50, and the nut 53 engaging with the screw shaft 52. The electric motor 50 rotates the screw shaft 52 to move the nut 53 in an axial direction of the screw shaft 52 to move the telescopic tube 23 along with the nut 53 in the axial direction of the main tube 22.

According to the configuration described above, the relative position of the telescopic tube 23 to the main tube 22 in the longitudinal direction may be easily and surely adjusted.

According to the aforementioned embodiment, the steering apparatus 2 further includes the speed reducing mechanism 54 arranged between the output shaft 51 of the electric motor 50 and the screw shaft 52. The speed reducing mechanism 54 reduces the rotational speed of the electric motor 50 and transmits the rotational force to the screw shaft 52 after the rotational speed has been reduced.

As described above, the speed reducing mechanism 54 is arranged between the output shaft 51 of the electric motor 50 and the screw shaft 52; thereby, the relative position of the telescopic tube 23 to the main tube 22 in the longitudinal direction may be further easily and smoothly adjusted.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A steering apparatus for a vehicle, adjusting a position of a steering wheel in a longitudinal direction of a vehicle body, the steering apparatus comprising:
a main tube supported by the vehicle body and having a tubular shape, the main tube including an opening portion being closed in an axial direction of the main tube and extending in the axial direction;
a telescopic tube supported by the main tube to be slidable within the main tube;
a connecting member having a tubular shape and being movable within the opening portion along the axial direction of the main tube, the connecting member possessing a first end attached to the telescopic tube and a second end;
a screw shaft and a nut threadingly engaging the screw shaft, at least a portion of the nut being housed within the connecting member;
the second end of the connecting member being positioned farther away from the telescopic tube in a direction orthogonal to the axial direction than a portion of the screw shaft closest to the telescopic tube;
a drive source configured to rotate the screw shaft and thereby move the nut, the connecting member and the telescopic tube in the axial direction; and
first and second lock portions positioned on opposite sides of the opening portion of the main tube along the axial direction, the connecting member being contactable with the first and second lock portions to prevent the nut from directly contacting the first and second lock portions.

2. The steering apparatus according to claim 1, wherein the first end of the tubular member is welded to a plurality of portions of the outer surface of the telescopic tube in an axial direction of the telescopic tube.

3. The steering apparatus according to claim 1, wherein the drive source is an electric motor supported by the main tube.

4. The steering apparatus according to claim 3, further comprising a speed reducing mechanism arranged between the output shaft of the electric motor and the screw shaft, the speed reducing mechanism reducing a rotational speed of the electric motor, and transmitting a rotational force to the screw shaft after the rotational speed has been reduced.

5. The steering apparatus according to claim 1, further comprising a cushioning member accommodating the nut within the connecting member.

6. The steering apparatus according to claim 1, wherein the connecting member possesses a rectangular cross section in a direction orthogonal to the axial direction, and the nut includes four exterior flat surfaces each facing a respective one of four interior side surfaces of the connecting member.

7. An apparatus for adjusting a steering wheel of a vehicle comprising:
a main tube fixable to the vehicle and extending along an axial direction, the main tube surrounding a hollow inner space and possessing an open axial end;
a hole formed in the main tube to provide access to the hollow inner space of the main tube;
a telescopic tube slidably supported within the main tube so that the telescopic tube is movable along the axial direction, the telescopic tube protruding from the open axial end of the main tube;
a connector attached to the telescopic tube and extending in a radial direction through the hole formed in the main tube;
a threaded shaft extending along the axial direction and a nut threadingly engaged to the threaded shaft, at least a portion of the nut being housed within the connector, the threaded shaft passing through both the nut and the connector;
a motor configured to rotate the threaded shaft and thereby move the nut, the connector and the telescopic tube along the axial direction; and
first and second stops positioned on opposite sides of the hole in the main tube to contact the connector when the telescopic tube moves into a fully-extended position or a fully-retracted position.

8. The apparatus of claim 7, wherein the connector possesses a rectangular cross section with four interior planar walls, and the nut possesses a rectangular cross section with four exterior planar walls each facing a respective one of the four interior planar walls of the connector.

* * * * *